Oct. 18, 1938. J. MERCIER Re. 20,887

CUSHIONING DEVICE

Original Filed Dec. 16, 1932

INVENTOR
Jean Mercier

BY Langner Parry Card & Langner
ATTORNEY

UNITED STATES PATENT OFFICE 20,887

CUSHIONING DEVICE

Jean Mercier, Neuilly-sur-Seine, France

Original No. 2,017,419, dated October 15, 1935, Serial No. 647,627, December 16, 1932. Application for reissue November 3, 1936, Serial No. 109,000. In France December 30, 1931

10 Claims. (Cl. 267—35)

The present invention relates to a cushioning device applicable to suspension devices for automobiles or other vehicles, landing gears for aircraft, buffers, percussion frames, shaking apparatus and generally to every device in which it is desirable to interpose a yielding element between two members adapted to move relatively to each other. This cushioning device is of the type in which a fluid under pressure is contained in a receptacle or container which is subject to deformation during the relative displacements of the two said members between which said container is interposed.

One object of the invention is to provide a cushioning device of the above mentioned type allowing said two members to be moved on a large extent with relation to each other for a relatively small diameter of said cushioning device.

Another object of the invention is to provide a cushioning device of the above mentioned type which is formed of a plurality of superimposed compartments communicating with one another and avoiding between said compartments the prejudicial joints causing generally leakage of the fluid contained in said compartments.

Another object of the invention is to provide a cushioning device of the above mentioned type which is effective in use and simple in the structure.

Figure 1:
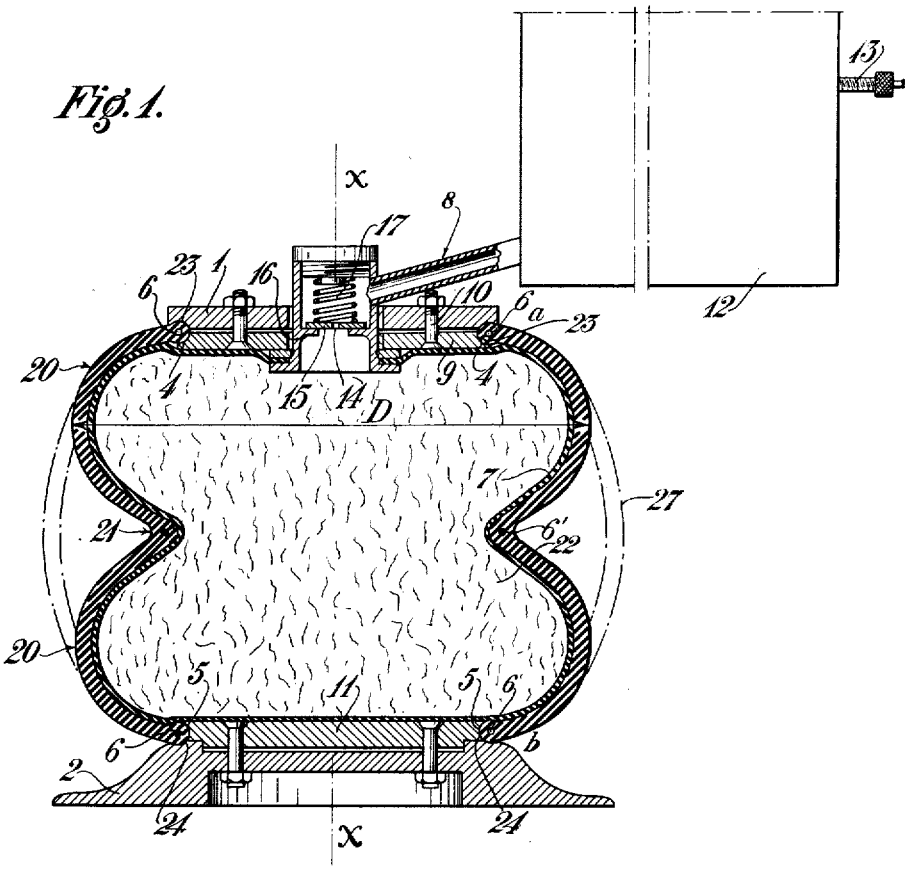
Figure 2:
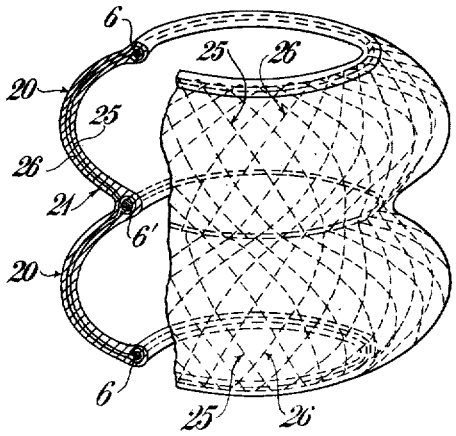

An embodiment of the cushioning device according to the invention is shown, in sectional view, on the Fig. 1 and in perspective view on the Fig. 2 of the accompanying drawing.

Between the two elements 1 and 2 whose relative displacements are to be damped is mounted a flexible outer casing 3 consisting of india rubber or like material. This casing, at least when in the idle position and before it is put in place, has a shape represented preferably by a surface of revolution about the axis X—X. The generatrix *a—b* of this surface of revolution consists of a curve having successive convex portions 20 and concave portions 21. This surface of revolution is bounded at its ends by two beaded edges 4 and 5 having optionally the same diameter and made inextensible by the use of inextensible rings 6 or like mountings. Moreover, the bottom of each concave portion 21 is also made inextensible by an intermediate mounting 6', such as a heavy cord or a steel wire. In comparison with casings formed only by a convex shaped member, the casing of the present invention affords a greater amplitude of motion for an outer diameter D which is less than the diameter of a single convex member, shown in the dotted lines 27, which would serve the same purpose. In comparison with separate superimposed elements, the casing of the present invention, which is made of one piece of rubber or like material, is of a simpler structure and has a greater flexibility.

The casing 3 is reinforced by a stiffening which consists of a tissue made of cord which is crossed but not woven of the kind in current use for the construction of the usual pneumatic tyres for vehicles. Fig. 2 shows two series of cords 25 and 26 which cross each other and which are embedded in the india rubber of the casing. The cords of the tissue are held upon the rings 6 and 6' as in the usual pneumatic types. The casing 3 may be fluid tight by itself, or it may be made fluid tight by inserting in said casing 3 an extensible inner chamber 7.

Air or another gaseous or liquid fluid required for inflating the casing 3 is supplied through the tube 8, the initial pressure in the casing 3 being regulated by hand or automatically.

The casing 3 is secured to the elements 1 and 2 by means of the wired edges 4 and 5. The edge 4 is held between the element 1 and a plate 9 which is secured to said element by bolts 10 or the like. The wired edge 5 is held in a like manner between a plate 11 and the second element 2. Annular external guideways 23 and 24 are formed in each inner plate 9 and 11 and in the corresponding members 1 and 2, the walls of said guideways diverging from the adjacent surfaces of said plate and member and being adapted to contain the beaded edges 4 and 5 of the casing 3.

The casing 3 may be connected to a chamber 12 by a passage having a cross section of such size as to afford the proper dampening of all oscillating movement. The circulation of fluid from the casing 3 to the chamber 12, or inversely, may be regulated for instance by a calibrated orifice 14 formed in a valve 15 urged upon its seating 16 by a calibrated spring 17. The chamber 12 is provided at 13 with a valve or like filling device.

When the two elements 1 and 2 approach each other in an abrupt manner, as soon as the fluid in the casing 3 becomes compressed to a degree corresponding to the allowable maximum, the valve 15 opens, thus compressing the spring 17 and the fluid will freely escape into the chamber 12.

In the case of relatively slow motion of the elements 1 and 2, or of motion having a small amplitude, the valve 15 remains upon its seating and the compressed fluid circulates through the calibrated orifice 14 in order to assume the desired dampening.

The dampening can also be obtained by placing in the casing 3 a piece of india rubber sponge 22 or like porous substance, which by reason of its nature will flatten the air or other elastic fluid in its recesses according as the pressure varies.

What is claimed is:

1. A cushioning device between two members whose relative displacements are to be damped comprising a substantially tubular deformable casing of flexible material bounded at its ends by two rounded beaded edges, at each end of said casing an inner plate, means for securing said inner plate to said corresponding member, and an annular external guideway of rounded section extending in the adjacent faces of each inner plate and of the corresponding member and having walls diverging from the adjacent surfaces of said plate and member at the inner end of said guideway to the free edges of said guideway and adapted to guide said beaded edges of said casing.

2. In a vehicle having in combination a body, running gear, and a pneumatic spring comprising a flexible fluid container between said body and said wheels serving as the sole supporting and dampening means between said wheel and body, said flexible container having a pair of enlarged radially extensible portions and a restricted radially inextensible portion between said extensible portions, said extensible portions having a cross-sectional contour comprising a substantial arc of a circle, the walls of said fluid container being reinforced to prevent longitudinal extensibility thereof, whereby the volumetric capacity of said container decreases upon axial compression or axial elongation thereof from an intermediate position, whereby the rate of said spring increases upon axial compression and a snubbing action takes place upon axial elongation.

3. A suspension for vehicles and the like comprising a flexible pneumatic cushioning device adapted to be connected between the body and wheels of a vehicle, said pneumatic cushioning device having a bulbous portion adapted to be compressed and elongated in absorbing road shocks, said device having embedded therein from end to end inextensible cords, so as to have an increase in rate on its recoil stroke, and a curved abutment plate engageable with said bulbous portion so that the device will also have an increase in rate on its compression stroke.

4. A suspension for vehicles and the like, comprising a pneumatic cushioning device having its opposite ends fixed, respectively, to the chassis and a wheel of said vehicle, said pneumatic cushioning device comprising a flexible container having convex radially expansible portions and a constricted non-expansible portion between said expansible portions, whereby the total volumetric capacity of said flexible container decreases from an intermediate value when said container is compressed or elongated, a reservoir, a conduit connecting the interior of said reservoir with the interior of said cushioning device and means in said conduit for permitting a greater flow in one direction than in the other.

5. A cushioning device adapted to be connected between two elements whose relative displacements are to be damped, comprising a flexible outer casing which, when in idle position, has a shape represented by a surface of revolution, the generatrix of said surface of revolution having successive arcuate convex portions and a concave portion intermediate said convex portions, said flexible casing having inextensible ends and inextensible means for restricting said concave portion to substantially the same diameter as that of said ends, whereby said casing affords a greater amplitude of relative movement between the ends thereof for a given outer diameter, as compared to the relative movement of a single convex casing of the same diameter, the relative height and diameter of the various portions of said casing being such that said arcuate convex portions will remain in circular form but of varying radii between the inextensible ends and said restricted concave portion during substantially full movement of said casing.

6. A cushioning device adapted to be connected between two elements whose relative displacements are to be damped, comprising a flexible outer casing which, when in idle position, has a shape represented by a surface of revolution, the generatrix of said surface of revolution having successive arcuate convex portions and a concave portion intermediate said convex portions, said flexible casing having inextensible ends and inextensible means for restricting said concave portion to substantially the same diameter as that of said ends, whereby said casing affords a greater amplitude of relative movement between the ends thereof for a given outer diameter as compared to the relative movement of a single convex casing of the same diameter, the relative height and diameter of the various portions of said casing being such that said arcuate convex portions will remain in circular form but of varying radii between the inextensible ends and said restricted concave portion during substantially full movement of said casing, said casing being reinforced with cords inclined in opposite directions obliquely with respect to the axis of said casing to restrict radial expansion thereof without undue tension and excessive local flexure of said cords.

7. A cushioning device adapted to be connected between two elements whose relative displacements are to be damped, comprising a flexible outer casing which, when in idle position, has a shape represented by a surface of revolution, the generatrix of said surface of revolution having successive arcuate convex portions and a concave portion intermediate said convex portions, said flexible casing having inextensible ends and inextensible means for restricting said concave portion to substantially the same diameter as that of said ends, whereby said casing affords a greater amplitude of relative movement between the ends thereof for a given outer diameter, as compared to the relative movement of a single convex casing, of the same diameter, the relative height and diameter of the various portions of said casing being such that said arcuate convex portions will remain in circular form but of varying radii between the inextensible ends and said restricted concave portion during substantially full movement of said casing, the walls of said pneumatic cushioning device being formed of a plurality of plies of rubberized fabric having parallel cords disposed obliquely to the axis of said tubular device and obliquely to each other, whereby localized flexing of the cords is substantially reduced and the motion of said device causes relative angular displacement between the cords of the different plies and substantially only relative longitudinal movement between the cords of the same ply.

8. A pneumatic suspension system for vehicles, said system comprising a longitudinally inextensibly reinforced flexible pneumatic cushion, and a reservoir in communication therewith, said cushion being positioned between, and having opposed ends attached to, the frame or body of the vehicle and the running gear, respectively thereof, to permit relative movement therebetween as the cushion is contracted or elongated, said cushion being so shaped that it has a lower rate in an intermediate region of its range of movement than it has at the extremities thereof.

9. A pneumatic vehicle suspension device comprising a deforable unitary casing having annular cross-section throughout and having an intermediate radially inextensible constricted portion and convex portions extending axially on either side of said constricted portion and terminating in ends of diameters less than the normal outside diameter of said convex portions, means for attaching said ends to parts of the vehicle to permit substantially uniform flexing of the convex portions between the ends thereof and said constricted portion, the wall of said casing having a plurality of layers of reenforcing cords extending from end to end thereof and inclined at an angle to the axis of said casing, the cords of one of said layers being inclined opposite to the cords of another of said layers, the inclination of the reenforcing cords in each layer relative to the axis of the casing and to the cords of the other layer being such as to afford a casing wall structure which is substantially inextensible in an axial direction.

10. A pneumatic vehicle suspension device comprising a deformable unitary casing adapted to hold a gas under pressure and for supporting a load between the axial extremities thereof, said casing having annular cross-sections throughout and having an intermediate radially inextensible portion and arcuate convex portions extending axially on either side of said intermediate portion, terminating in circumferentially inextensible ends having diameters less than the maximum outside diameter of said convex portions, means for attaching said ends to parts of said vehicle to permit substantially uniform arcuate flexing and substantially equal change of cross-sectional contour of each of the convex arcuate portions between the respective ends thereof, and the wall of said casing having a plurality of layers of reenforcing cords extending from end to end thereof between said inextensible ends, the cords of one of said layers being inclined oppositely to the cords of another of said layers and the cords of each layer being inclined at such an angle to the axis of said casing, that a casing wall structure is formed which is substantially inextensible in an axial direction.

JEAN MERCIER.

CERTIFICATE OF CORRECTION.

Reissue No. 20,887. October 18, 1938.

JEAN MERCIER.

It is hereby certified that the above numbered patent was erroneously issued to the inventor, said "Mercier", whereas said patent should have been issued to --The Firestone Tire & Rubber Company, of Akron, Ohio, a corporation of Ohio--, as assignee by mesne assignments of the entire interest therein, as shown by the record of assignments in this office; and that the said Letters Patent should be read with this correction therein that the same may conform to the record of the case in the Patent Office.

Signed and sealed this 6th day of October, A. D. 1942.

(Seal)

Henry Van Arsdale,
Acting Commissioner of Patents.